United States Patent Office 2,892,670
Patented June 30, 1959

2,892,670
COLORING PROCESS

Frederick Richard Alsberg, Robert Norman Heslop, Ian Durham Rattee, and William Elliot Stephen, all of Blackley, Manchester, England, assignors to Imperial Chemical Industries Limited, London, England, a corporation of Great Britain No Drawing. Application May 5, 1958
Serial No. 732,841

Claims priority, application Great Britain
November 29, 1954

27 Claims. (Cl. 8—39)

This invention lies in the art of coloring textile materials. More particularly, this invention relates to a new and novel process for coloring cellulose textile materials such as cotton, mercerized cotton, rayon and other regenerated cellulose materials. As will be seen from the description hereinafter, this invention has application to both dyeing and printing processes and is employed in conjunction with the use of particular dyestuff materials which are caused to react with the above-mentioned textile materials. As will be evident from the following description of the invention, these dyestuffs are characterized as anthraquinonoid dyestuff having a —C(Halogen)=N— group and an ionogenic solubilizing group.

This application is a continuation-in-part of application, Serial No. 549,160, now abandoned.

Prior art techniques for dyeing or printing textile materials with dyestuffs involving a reaction with a —C(Halogen)=N— group have exhibited numerous disadvantages and required complicated procedures which have been commercially unsatisfactory. The dyed material has also been unsatisfactory in its color stability and resistance to washing, etc.

Thus, British Patent No. 342,167 describes a treatment of alkali cellulose with a compound such as cyanuric chloride to obtain a derivative which, while immunized to the normal direct cotton dyestuffs and dyeing techniques, has a strong affinity for basic and insoluble acetate silk dyestuffs.

U.S. Patent No. 1,886,480 further teaches a process for dyeing cellulosic derivatives of the same type employed in said British patent which also contains a reactive halogen atom. These materials are dyed with a compound containing, in addition to its chromophoric group, an active hydrogen atom, for instance, amino dyestuffs. It is also possible to form an intermediate cellulose derivative which can then be diazotized and coupled with another compound, or directly coupled with a diazo compound.

Invariably, the above procedures require a separate and preliminary treatment of cellulose with alkali to form alkali cellulose prior to the introduction of any dyestuff-yielding material. Furthermore, the treatment of this already-formed alkali cellulose with the dyestuff, or dyestuff-yielding reagent, is invariably conducted in an organic solvent solution. The necessity of performing separate and distinct steps in carrying out a reaction has economic and technical disadvantages, and it is well known to be generally desirable to eliminate as many steps in a process as possible. Equally well, it is readily appreciated that a technique requiring an organic solvent is also economically undesirable. Not only are organic solvents expensive, but they are also of a hazardous nature, and the employment of such materials on an industrial scale means that simultaneously there will need to be employed special reaction vessels and techniques to assure safety of the workers and the plant. On the other hand, if the organic solution containing the dyestuff-yielding agent used in U.S. 1,886,480 is replaced by an aqueous solution of a water-soluble dyestuff containing the halogeno-s-triazine group, little or no dyeing takes place.

It is, therefore, an object of this invention to overcome disadvantages found in the prior art.

One object of this invention is to provide a useful process for coloring the textile materials, such as cotton, mercerized cotton, rayon and other regenerated cellulose materials, which is carried out wholly in an aqueous medium.

More particularly, it is an object of this invention to provide an aqueous process for coloring textile materials with an anthraquinonoid dyestuff having an ionogenic solubilizing group, and an amino group carrying as N-substituent a 1:3:5 triazine radical having a carbon-halogen grouping and where the dyestuff is applied directly to the above-noted textile materials without preliminary treatment to form an alkali cellulose compound.

It is a further object of this invention to provide an aqueous process for dyeing textile materials which comprises impregnating said materials with an aqueous solution of an anthraquinonoid dyestuff having an ionogenic solubilizing group and an amino group carrying as N-substituent a 1:3:5 triazine radical having a carbon-halogen grouping and thereafter subjecting the impregnated material to the action of an acid-binding agent.

Another object of this invention is to provide a process for printing textiles with a printing paste containing an anthraquinonoid dyestuff and thereafter subjecting the textile material to the action of an acid-binding agent.

Other objects of this invention will be apparent to one skilled in the art from the description following hereinafter.

The above-described objects of the invention are achieved broadly, by treating a textile material with a class of water-soluble anthraquinonoid dyestuffs, defined hereinafter, in aqueous medium, and then with an aqueous solution or suspension of an acid-binding agent. The process is adapted to both dyeing and printing techniques. The textile material is either impregnated or printed, as the case might be, treated with the acid-binding agent and then, in general, exposed to the action of elevated temperatures and dried.

Another object of this invention is to provide a process for printing textiles with a printing paste containing an anthraquinonoid dyestuff as defined above and also containing a salt of a weak inorganic acid.

As a result of these procedures, there is obtained a colored textile material having highly desirable properties of fastness, abrasion resistance, washability, durability, etc., and in particular, a high degree of fastness to wet processes; for example, to washing and boiling with a sodium carbonate solution which makes it seem likely that the dyestuff has become chemically linked to the textile material. It is most surprising that reaction should take place under the mild operative conditions of the new coloration process, since it appears from the literature that alkali cellulose is only formed when cellulose is treated with concentrated aqueous solutions of caustic alkalis of at least 13.5% by weight, whilst the process of the present invention yields valuable colorations from solutions of non-caustic alkalis and also from solutions of caustic alkalis containing as little as 0.01% by weight of the alkali.

In this application the term "anthraquinonoid" is used with reference to dyestuff having within its structure the characteristic structure of the compound anthraquinone:

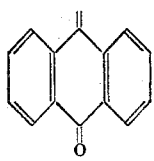

as, for example, in anthraquinone and related ring systems containing a 5- or 6-membered carbocyclic or heterocyclic ring connected across the 1 and the 9 positions as, for example, in anthrapyrimidines, anthrapyridones, benzanthrones and anthrapyrazoles. It will be appreciated, of course, that this structure can be substituted by different groups as will be fully described and exemplified hereinafter, but the essential characteristic of the anthraquinone ring system will be present.

The dyestuffs which may be used in the present invention may be generally represented by compounds having the structural formula:

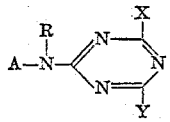

or the formula

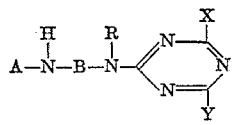

In this formula, A represents the above-noted anthraquinonoid ring system, B stands for a divalent bridging group, R is an alkyl, cycloalkyl, aralkyl, or hydrogen radical, X is a chlorine or bromine atom and Y is a chlorine or bromine atom or an organic radical, as for instance aryl, aryloxy, arylthio, alkyl, alkoxy, alkylthio, amino, alkylamino, dialkylamino, arylamino, aralkylamino, cycloalkylamino. Y can also represent a radical of an aminoazo compound. More explicitly, A represents a radical having an anthraquinone ring system and substituted by an ionogenic solubilizing group. More than one such solubilizing group may be present and this ring system may also be substituted by other groups and/or radicals such as halogen, alkyl, aryl, and generally organic radicals as are commonly used in quinone dyestuffs. It is also within the scope of this invention to employ a dyestuff as defined by the above formula wherein the anthraquinone ring system represented by A is in turn substituted again by a group of the following structure:

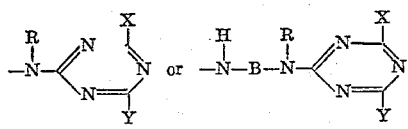

The bridging group may represent, for example, a phenylene radical, biphenylene group or a group

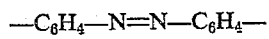

but is not limited to these, its main function being to link the triazine ring to the anthraquinonoid ring system. The benzene rings may be substituted by anionic solubilizing groups as well as by alkyl, alkoxy, and halogen radicals.

This invention also contemplates the use of dyestuffs wherein R contains substituents, e.g. where R is an hydroxy alkyl group.

The dyestuffs just described may be formed by a number of suitable processes. Such dyestuffs include those disclosed in the copending applications, Ser. No. 549,175, filed November 25, 1955; Ser. No. 549,176, filed November 25, 1955; Ser. No. 634,622, filed January 17, 1957; Ser. No. 646,526, filed March 18, 1957, by one or more of us.

These dyestuffs are of varying types and may be represented by the following structural formula

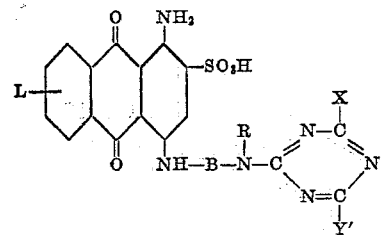

In the above formula, B is a bridging group as defined above, X stands for halogen, R is hydrogen, alkyl hydroxyalkyl, cycloalkyl, or an aralkyl radical, L stands for hydrogen or an ionogenic solubilizing group, X is a halogen, and Y' stands for halogen and —OR.

By way of further definition and description of the type of dyestuffs which may be employed in this invention, the following list is presented herewith. It will be understood that this list is not to be deemed as limiting the invention to the specific dyestuffs set forth therein but rather as indicating to one skilled in the art the breadth and general types of materials which may be used. The color of the dyestuff, when applied to the cellulose materials according to the present process, is also indicated for convenience.

It will be appreciated that the process of this invention is particularly valuable for use with those dyestuffs falling within the class defined hereinbefore which, when dyed from a neutral bath, have a low substantivity on cellulose since the reaction of the dyestuff with the fibre is never 100% complete, and unreacted dyestuffs of low substantivity can be readily washed out by a scouring process as described hereafter, especially those dyestuffs

TABLE OF DYESTUFFS

| Dyestuff No. | Dyestuff | Shade obtained when applied to cellulosic materials |
|---|---|---|
| 1 | Dyestuff prepared by condensing one mol of cyanuric chloride with one mol of trisodium salt of 1-amino-4-(4'-methylamino)anilino-2,3',5-trisulfonic acid anthraquinone. | reddish-blue. |
| 2 | Dyestuff prepared by condensing one mol of cyanuric chloride with one mol of the disodium salt of 1-amino-4-(4'-methylamino)anilino-2,3'-disulfonic acid anthraquinone. | Do. |
| 3 | Dyestuff prepared by condensing one mol of cyanuric chloride with one mol of the disodium salt of 1-amino-4-(4'-n-butyl-amino)anilino-2,3'-disulfonic acid anthraquinone. | Do. |
| 4 | Dyestuff prepared by condensing one mol of cyanuric chloride with one mol of the disodium salt of 1-amino-4-(4'-cyclohexylamino)anilino-2,3'-disulfonic acid anthraquinone. | Do. |
| 5 | Dyestuff prepared by condensing one mol of cyanuric chloride with one mol of the disodium salt of 1-amino-4-(3'-carboxy-4'-methylamino)anilino-2-sulfonic acid anthraquinone. | blue. |
| 6 | Dyestuff prepared by condensing one mol of cyanuric chloride with one mol of the disodium salt of 1-amino-4-(3'-β-hydroxyethylamino)anilino - 2,5 - disulfonic acid anthraquinone. | reddish-blue. |
| 7 | Dyestuff prepared by condensing one mol of cyanuric chloride with one mol of the trisodium salt of 1-amino-4-(4'-amino)anilino - 2,3',5 - trisulfonic acid anthraquinone. | greenish-blue. |
| 8 | Dyestuff prepared by condensing one mol of cyanuric chloride with one mol of the trisodium salt of 1-amino-4-(4'-4''-aminophenylazo)anilino - 2,2'',5 - trisulfonic acid anthraquinone. | olive green. |
| 9 | Dyestuff prepared by condensing one mol of cyanuric chloride with one mol of the trisodium salt of 1-amino-4-(4'-amino)anilino - 2,3',6-trisulfonic acid anthraquinone. | greenish-blue. |
| 10 | Dyestuff prepared by condensing one mol of cyanuric chloride with one mol of the trisodium salt of 1-amino-4-(3'-carboxy - 4' - amino)anilino - 2,5-disulfonic acid anthraquinone. | Do. |

TABLE OF DYESTUFFS—Continued

| Dyestuff No. | Dyestuff | Shade obtained when applied to cellulosic materials |
|---|---|---|
| 11 | Dyestuff prepared by condensing one mol of cyanuric chloride with one mol of the trisodium salt of 1-amino-4-(3'-amino)anilino-2,4',5-trisulfonic acid anthraquinone. | blue. |
| 12 | Dyestuff prepared by condensing one mol of cyanuric chloride with one mol of the trisodium salt of 1-amino-4-(4'-4''-aminophenyl)anilino - 2,3'',5 - trisulfonic acid anthraquinone. | greenish-blue. |
| 13 | Dyestuff prepared by condensing one mol of cyanuric chloride with one mol of the disodium salt of 1-amino-4-(4'-amino)anilino-2,3'-disulfonic acid anthraquinone. | Do. |
| 14 | Dyestuff prepared by condensing one mol of cyanuric chloride with one mol of the disodium salt of 1-amino-4-(3'-amino)anilino-2,4'-disulfonic acid anthraquinone. | reddish-blue. |
| 15 | Dyestuff prepared by condensing one mol of cyanuric chloride with one mol of the disodium salt of 1-amino-4-(2'-methyl - 5' - amino)anilino - 2,4' - disulfonic acid anthraquinone. | Do. |
| 16 | Dyestuff prepared by condensing one mol of cyanuric chloride with one mol of the disodium salt of 1-amino-4-(2'-methyl - 3' - amino)anilino - 2,5' - disulfonic acid anthraquinone. | Do. |
| 17 | Dyestuff prepared by condensing one mol of cyanuric bromide with one mol of the disodium salt of 1-amino-4-(3'-amino)-anilino-2,4'-disulfonic acid anthraquinone. | Do. |
| 18 | Dyestuff prepared by condensing one mol of 2,4-dichloro-6-methoxy-s-triazine with one mol of the disodium salt of 1-amino-4-(4'-methylamino)anilino-2,3'-disulfonic acid anthraquinone. | Do. |
| 19 | Dyestuff prepared by condensing one mol of 2,4-dichloro-6-methoxy-s-triazine with one mol of the sodium salt of 1-amino-4-(4'-methylamino)anilino-2-sulfonic acid anthraquinone. | blue. |
| 20 | Dyestuff prepared by condensing one mol of 2,4-dichloro-6-methoxy-s-triazine with one mol of the disodium salt of 1-amino-4-(3'-β-hydroxyethylamino)anilino-2,5-disulfonic acid anthraquinone. | Do. |
| 21 | Dyestuff prepared by reacting one mol of 2,4-dichloro-6-phenoxy-s-triazine with one mol of the disodium salt of 1-amino-4-(4'-n-butylamino)anilino-2,3'-disulfonic acid anthraquinone. | reddish-blue. |
| 22 | Dyestuff prepared by reacting one mol of cyanuric chloride with one mol of the disodium salt of 1-amino-4-(4'-amino)anilino 2,3-disulfonic acid anthraquinone. | blue. |
| 23 | Dyestuff prepared by reacting one mol of cyanuric chloride with one mol of the disodium salt of 1-amino-4-anilino-2,5-disulfonic acid anthraquinone. | violet. |
| 24 | Dyestuff prepared by reacting one mol of cyanuric chloride with one mol of the disodium salt of 1-amino-4-(4'-amino)anilino-2,5-disulfonic acid anthraquinone. | blue. |
| 25 | Dyestuff prepared by reacting one mol of cyanuric chloride with one mol of the trisodium salt of 1-amino-4-(4'-amino)anilino-2,3',5-trisulfonic acid anthraquinone. | Do. |
| 26 | Dyestuff prepared by reacting one mol of cyanuric chloride with one mol of the trisodium salt of 1-amino-4-(4'-(4''-amino) phenylazo)anilino-2,3'',5-trisulfonic acid anthraquinone. | olive green. |
| 27 | Dyestuff prepared by reacting one mol of cyanuric chloride with two molecular proportions of the sodium salt of 1-amino-4-(4'-amino)anilino-2-sulfonic acid anthraquinone. | greenish-blue. |
| 28 | Dyestuff prepared by reacting one mol of cyanuric chloride with one mol of the sodium salt of 1,4-diamino-2-sulfonic acid anthraquinone. | violet. |
| 29 | Dyestuff prepared by reacting one mol of cyanuric chloride with one-half mol of the tetrasodium salt of 1,5-dihydroxy-4,8-di(4'-amino-3'-sulfo)anilino-2,6-disulfonic acid anthraquinone. | greenish-blue. |
| 30 | Dyestuff prepared by reacting one mol of cyanuric chloride with one mol of the disodium salt of 6-(4'-amino-3'-sulfo-anilino)-2- (2''-hydroxy-3''-sulfophenyl) anthrapyrimidine. | red. |
| 31 | Dyestuff prepared by reacting one mol of cyanuric chloride with one mol of the sodium salt of 4-amino-4'-hydroxyazobenzene-3'-carboxylic acid and with one mol of 1-amino-4-(3'-sulfo-4'-amino)-anilino-2-sulfonic acid anthraquinone. | yellowish green. | which have a lower affinity for cellulose than does chrysophenine G. The words "substantivity" and "affinity" are used herein with the meanings defined on pages 172 and 102 respectively in "The Physical Chemistry of Dyeing," second edition, by T. Vickerstaff, published in 1954 by Oliver Boyd, London.

As discussed hereinbefore, the process of this invention comprises applying the anthraquinone-triazinohalide dyestuff to the cellulose textile material and subjecting it to the action of an acid-binding agent after the treatment with the dyestuff.

As acid-binding agents, this invention contemplates substances having a pH in decinormal aqueous solution of at least 8.5 and also substances having low solubility which give saturated aqueous solutions having a pH of this or a higher value, for example inorganic and organic bases such as sodium hydroxide, potassium hydroxide, hydrated magnesium oxide, and triethanolamine etc., and also the salts of weak inorganic acids such as sodium carbonate, tripotassium phosphate, sodium silicate, triethanolamine carbonate and sodium borate. These materials will characteristically be used directly as the acid-binding agent. Alternatively, this invention may be practiced by impregnating the goods with the dyestuff and with a reagent which will release such an acid-binding agent upon being subjected to an elevated temperature. These latter reagents include such materials as alkali metal bicarbonates as well as materials such as sodium trichloroacetate.

When the invention is practiced as a dyeing process, the cellulosic material may be padded with an aqueous solution of the dyestuff. In general, this process can be carried out conveniently in the cold, that is at a temperature from about 10° C. to about 30° C. but this range is not restrictive. With tightly woven textiles and other fibres which are in a form which is difficult to penetrate with aqueous solutions, a higher temperature, for example about 50° C., is superior. The concentration of the aqueous solution of the dyestuff may be from about 0.01% to about 15% or even higher if the solubility of the dyestuff will permit. The padding process will be carried out to a point such that the fabric has picked up from 50% to 200% or more of its weight of the solution, depending on the ratio of the weight of dyestuff, relative to the weight of the material, which is desired.

After padding, the material may be dried at a temperature of from about 40° C. to about 60° C. On the other hand, the drying stage may be omitted, especially in the case of continuous processes, or may be carried out, in the latter event, at elevated temperatures of, for example, from about 70° C. to about 170° C.

The dried material may then be impregnated with a cold aqueous solution of the acid-binding agent and preferably the material is then subsequently subjected to an elevated temperature e.g. by steaming at a temperature of from about 95° C. to about 102° C. The solution of the acid-binding agent used in this modification of the process may have a concentration of from about 0.05% to 20% or more preferably between 1% and 3%, and may conveniently be employed at a temperature from room temperature to that of the boiling solution. The steam may be generated in situ by subjecting the moist material to a source of dry heat such as an oven, a stenter, a molten metal bath or the outer surface of steam heated cylinders.

The impregnated textile material may be immersed in the acid-binding agent solution for a period of time which will vary with the conditions and the dyestuff but ordinarily will not require more than a few minutes. Generally speaking, when caustic alkali is used at a temperature lower than 100° C., or, no matter what the acid-binding agent, if the material is subsequently heated or steamed, one minute will suffice to carry out the reaction. If a non-caustic alkali is used and there is to be no subsequent heating or steaming step, then a longer treatment is desirable and the duration of this may be from 5 minutes to 1 hour depending on the temperature of the solution of acid-binding agent.

After treatment in the solution of the acid-binding agent the textile material should be rinsed. Preferably it is then treated with a dilute solution of a weak acid in order to neutralize any residual alkaline agent. For best results, the material is then again rinsed and dried. The solution of the weak acid may have a concentration of from about 0.01 N to 2 N, and the acidic component may comprise a weak inorganic acid or acid salt such as sodium bicarbonate, sodium bisulphate or a weak organic acid, for example acetic acid, or propionic acid. The choice of the actual acid used is not critical in the practice of this invention, only the function thereof being significant in neutralizing the cloth.

In that embodiment of the invention where the material is to be treated with a substance which liberates an acid-binding agent on heating or steaming, this may be done either before, or after impregnation with the dyestuff but preferably the substance is added to the dyestuff solution. After the textile material has been impregnated with the dyestuff and the substance noted above, it is then subjected to the action of elevated temperatures to liberate the alkali acid-binding agent. It will be appreciated that only at this point is the desired alkalinity introduced into the material.

Thereafter, the material may be rinsed and dried, as described above, and, if desired treated with weak acidic solution, as noted above.

Advantageously, the aqueous solution of the acid-binding agent may contain additional substances for instance inorganic salts of alkali metals for example sodium sulfate and sodium chloride, and it is preferred to use as the acid-binding agent a solution of caustic alkali which contains a high concentration of sodium chloride in solution.

The aqueous impregnating solution may also contain the usual dyebath additives customarily employed. These include urea, wetting agents such as heavy sulfonated oils and water-soluble alkylethers of cellulose and migration inhibitors such as sodium alginate.

As previously mentioned, this invention also encompasses techniques for printing cellulose textile materials. The process for dyeing cellulose textile materials may be simply modified by locally printing with a printing paste containing the dyestuff instead of impregnating the whole of the textile with an aqueous solution of the dyestuff, and thereafter subjecting the textile to a solution of an acid-binding agent as indicated above. A valuable modification of this printing process comprises applying a printing paste specially prepared to the material and thereafter heating or steaming the so-treated textile thus eliminating the separate treatment with an acid-binding agent.

The printing paste used herein contains a dyestuff as set forth hereinabove and an acid-binding agent or a reagent which will release an acid-binding agent on heating or steaming. Here, again, the acid-binding agents include non-caustic alkalis and preferably salts of weak inorganic acids. The reagents which suitably release an acid-binding agent include alkali metal bicarbonates and materials such as sodium trichloroacetate.

Conventional adjuvants may also be present in the printing paste such as urea and thickening agents such as methyl cellulose, starch and locust bean gum. It is preferred, however, to use as the thickening agent, an agent free from primary alcoholic hydroxyl groups, and in particular an alginate, for example sodium alginate.

Generally speaking, the processes described herein apply to the entire class of dyestuffs set forth hereinabove. There are preferred modifications, as will be indicated in the subsequent examples, which are particularly advantageous with specific types of the dyestuffs. We have also observed that when the textile material is not dried after the dyestuff impregnation, then (a) when a di- halogeno-triazine dyestuff is used it is advantageous to employ a cold aftertreatment with alkali, and (b) when a monohalogeno-triazine dyestuff is used it is advantageous to employ a hot aftertreatment (i.e., at 50° C. or above), for best results.

A further preferred embodiment of the invention lies in the use of buffered compositions.

Conveniently, the dyestuff can be admixed with the buffering substance or substances in the preparation of the dyestuff itself, and this provides a desirable mixture for use in the present process. Particularly suitable buffers include mixtures of disodium or dipotassium hydrogen phosphate with monosodium or monopotassium dihydrogen phosphate. The mixtures which are preferred are those which will maintain the coloring medium at a pH within the range of from 6 to 8, preferably from 6 to 7. A mixture having these characteristics is, for example, that formed of seven parts of anhydrous disodium hydrogen phosphate and 12.5 parts of anhydrous potassium dihydrogen phosphate. Another suitable mixture is that formed from one part of anhydrous disodium hydrogen phosphate and two parts of anhydrous potassium dihydrogen phosphate. As illustrated in, for instance, Example 7 hereinafter, the buffer mixture may be introduced during the preparation of the dyestuff as well as being admixed with the resulting solid product therefrom.

By way of illustrating the above features of the invention and the various embodiments thereof, the following examples are provided but it will be appreciated that the invention is not limited to the specific embodiments set forth therein. In these examples, the "parts" given are by weight.

*Example 1*

100 parts of cotton limbric are padded with a cold 2% solution of the anthraquinonoid dyestuff prepared as described below, containing 0.2% of a highly sulphonated oil and squeezed until its total weight is 2–2.25 times the weight of the original limbric, and then dried at 40–50° C. The limbric is then immersed in a 6% solution of sodium hydroxide, saturated with sodium chloride, for 2 minutes at 95° C. The cotton limbric is then removed, rinsed thoroughly in hot water, immersed in a cold 0.2% aqueous solution of acetic acid and again rinsed in hot water. It is then scoured for 2 minutes in a boiling aqueous solution containing 2% of soap and 5% of anhydrous sodium carbonate and then again rinsed in hot water and dried. The cotton limbric is thus colored a blue shade possessing good fastness to washing and to light.

The dyestuff used in the process of the above example may be obtained as follows: A solution of 18.5 parts of cyanuric chloride in 120 parts of acetone is added gradually to a stirred mixture of 400 parts of water and 400 parts of crushed ice. To the suspension of cyanuric chloride thus obtained is added during 30 minutes with stirring a solution at 15–20° C. containing 53.3 parts of disodium 1 - amino - 4 - (4'-amino)anilinoanthraquinone-2:3'-disulphonate in 1200 parts of water, while keeping the temperature of the reaction mixture below 4° C. Stirring is continued for 15 minutes after the addition of the solution of the disulphonate is complete and then sufficient 2 N. sodium solution is gradually added during 40 minutes to render the mixture neutral to litmus. Sufficient common salt to give a solution containing 200 grams of salt per litre of solution, is then added, and the mixture stirred until separation of the dyestuff is complete; the mixture is then filtered and the solid residue is washed with 20% salt solution and dried at room temperature.

*Example 2*

100 parts cotton limbric are padded with a cold 0.5% aqueous suspension of the anthraquinonoid dyestuff prepared as described below, containing 0.2% of a highly sulphonated oil, squeezed until its total weight is 230 parts and then dried at 40° C. The limbric is then treated with a 6% aqueous solution of sodium hydroxide saturated with sodium chloride in the manner described in Example 1, and then rinsed and dried as also described in Example 1. The cotton limbric is thereby colored to a violet shade possessing good fastness to washing.

The dyestuff used in the process of the above example may be obtained as follows:

A solution of 5 parts of cyanuric chloride in 24 parts of acetone is added gradually to a stirred mixture of 100 parts of water and 100 parts of crushed ice. To the stirred suspension of cyanuric chloride thus obtained there is added during 1 hour a solution containing 13 parts of the disodium salt of 1-amino-4-anilinoanthraquinone disulphonic acid (obtained by disulphonating 1-amino-4-anilinoanthraquinone) in 300 parts of water, the temperature of the reaction mixture being kept at 10° C. The solution is stirred for a further 2 hours at 10° to 15° C. and sufficient 2 N. sodium carbonate solution is gradually added to the violet solution obtained to render it neutral to litmus. Sufficient common salt to give a solution containing 180 grams of salt per litre of solution is then added, and the mixture is stirred for 3 hours, and poured into 1400 parts of acetone while stirring. Stirring is continued for 3 hours and the dyestuff is then filtered off, washed with acetone and dried at room-temperature.

*Example 3*

100 parts of cotton limbric are padded with a cold 1% aqueous solution of the anthraquinonoid dyestuff prepared as described below, containing 0.2% of a highly sulphonated oil, squeezed until its total weight is 2.5 times the weight of the original limbric and then dried at 40° C. It is then treated with a 6% aqueous solution of sodium hydroxide saturated with sodium chloride in the manner described in Example 1, and then rinsed and dried as described in Example 1. The cottom limbric is thereby colored to a bright blue shade of good fastness to washing and to light.

The dyestuff used in the process of the above example may be obtained as follows:

To a stirred suspension of 5 parts of cyanuric chloride in 100 parts of water and 100 parts of crushed ice prepared as described in Example 2, a solution containing 13.3 parts of disodium 1-amino-4(4'-amino)anilinoanthraquinone-2:5-disulphonate in 300 parts of water is added during 45 minutes, the temperature of the reacting mixture being maintained at 0° to 4° C. Stirring is continued for a further 15 minutes and then 2 N. sodium carbonate solution is added gradually during 40 minutes until the mixture is neutral to litmus. Sufficient common salt to give a solution containing 140 grams of salt per litre of solution is then added and stirring is continued until the precipitation of the dyestuff is complete. The dyestuff is filtered off, washed with 14% brine and dried at room-temperature.

*Example 4*

100 parts of bleached cotton cloth are padded with a cold 3% aqueous solution of the anthraquinonoid dyestuff used in Example 1 containing 0.5% of a highly sulphonated oil until its total weight is twice that of the original dry cotton cloth. The cloth is dried at 40° C. and then impregnated at 90° C. in a saturated solution of sodium chloride containing 3% of sodium carbonate, squeezed until its weight is twice that of the original cloth, and then steamed for 2 minutes. The cloth is rinsed thoroughly in water, boiled in a detergent solution for 5 minutes, rinsed and dried. The cotton cloth is thereby colored to a blue shade possessing good fastness to washing and to light.

*Example 5*

100 parts of cotton limbric are padded with a cold 2.55% aqueous solution of the anthraquinonoid dyestuff prepared as described below, containing 0.2% of a highly sulphonated oil, squeezed until its total weight is twice that of the original limbric and then dried at 40° C. It is then treated for 1 minute at 95° C. in a 6% aqueous solution of sodium hydroxide saturated with sodium chloride, and steamed for 2 minutes. The limbric is then rinsed thoroughly with hot water, immersed in a cold 1% aqueous solution of sodium bicarbonate for 1 minute, rinsed again with hot water and scoured and dried as described in Example 1. The cotton limbric is thereby colored to a deep blue shade possessing very good fastness to washing and to light.

The dyestuff used in the process of the above example may be obtained as follows:

A solution of 6.7 parts of cyanuric chloride in 32 parts of acetone is added gradually to a stirred mixture of 100 parts water and 100 parts of crushed ice. To the stirred suspension of cyanuric chloride thus obtained there is added during 1 hour a solution containing 21.2 parts of trisodium 1-amino-4-(4'-amino-anilino)anthraquinone-2:3':5-trisulphonate in 300 parts of water, the temperature of the reaction mixture being maintained at 0° to 4° C. Stirring is continued a further 10 minutes after the addition of the trisulphonate solution and when sufficient 2 N. sodium carbonate solution is added gradually over 40 minutes to render the reaction mixture neutral to litmus. Sufficient common salt to give a solution containing 200 grams salt per litre of solution is then added, the mixture stirred until separation of the dyestuff is complete and the dyestuff is finally filtered off, washed with 20% brine and dried at room-temperature.

*Example 6*

100 parts of cotton limbric are padded with a cold 2.55% aqueous solution of the anthraquinonoid dyestuff used in Example 5 containing 0.2% of a highly sulphonated oil, squeezed until its total weight is twice that of the original limbric and dried at 40° C. It is then treated for 1 minute at 95° C. in a 20% aqueous solution of anhydrous sodium carbonate saturated with sodium chloride, and then steamed for two minutes. The cloth is rinsed thoroughly with hot water and scoured and dried in the manner described in Example 1. The cotton limbric is thereby colored to a deep blue shade possessing good fastness to washing and to light.

*Example 7*

100 parts of cotton limbric are padded with a cold 2.4% aqueous solution of the anthraquinonoid dyestuff prepared as described below containing 0.2% of a highly sulphonated oil, squeezed until its total weight is twice that of the original limbric and dried at 40° C. It is then treated for 1 minute at 95° C. in a 3% aqueous solution of sodium hydroxide saturated with sodium chloride, and steamed for 2 minutes. The limbric is then rinsed, neutralized, scoured and dried as described in Example 5. The limbric is thereby colored to a deep olive green shade of very good fastness to washing and to light.

The dyestuff used in the process of the above example may be obtained as follows:

A solution of 4.06 parts of cyanuric chloride in 20 parts of acetone is added gradually to a stirred mixture of 50 parts of water and 100 parts of crushed ice. To the suspension of cyanuric chloride thus obtained there is added during 1 hour with stirring a solution containing 14.8 parts of trisodium 1-amino-4-[4'-(4''-amino)benzeneazo]anilino-anthraquinone trisulphonate (prepared for example by condensing 4-bromo-1-aminoanthraquinone-2:5-disulphonic acid with 4:4'-diamino-azobenzene-2-sulphonic acid) in 250 parts of water while keeping the temperature of the reaction mixture at 0° to 4°.

C. After the addition of the trisulphonate solution, stirring is continued for a further 40 minutes and sufficient 2 N. sodium carbonate solution is added gradually over 30 minutes to render the reaction mixture neutral to litmus. A solution containing 11.4 parts of disodium hydrogen phosphate and 7.2 parts of potassium dihydrogen phosphate in 100 parts of water is then added, the reaction mixture is stirred for a few minutes and sufficient common salt to give a solution containing 50 grams of salt per litre of solution is then added. Stirring is continued until separation of the dyestuff is complete. The dyestuff is filtered off, washed with a solution containing 25 parts of common salt, 11.4 parts of disodium hydrogen phosphate and 7.2 parts of potassium dihydrogen phosphate in 500 parts of water, and finally dried at room temperature.

*Example 8*

A printing paste is made up with the following composition:

| | Parts |
|---|---|
| Dyestuff of Example 5 | 5 |
| Urea | 5 |
| Water | 29 |
| Sodium alginate (4% aqueous solution) | 60 |
| Sodium bicarbonate | 1 |
| | 100 |

This paste is applied to mercerized cotton fabric on a roller printing machine. The fabric is dried and steamed for 2 minutes. The print is then washed in cold water and soaped for 10 minutes at 100° C. in a solution containing 2 parts of soap per 1000 parts of water, rinsed in cold water and dried. The deep blue print so obtained possesses very good fastness to light and to washing.

*Example 9*

A printing paste is made up with the following composition:

| | Parts |
|---|---|
| Dyestuff of Example 5 | 3 |
| Urea | 5 |
| Water | 32 |
| Sodium alginate (4% aqueous thickening) | 60 |
| | 100 |

The composition is applied to cotton fabric on a roller printing machine. The fabric is dried, and padded through an aqueous solution at 25° C. containing 4% sodium hydroxide. The print is dried and steamed for 2 minutes. The print is then washed in cold water and soaped for 10 minutes at 100° C. in a solution containing 2 parts of soap per 1000 parts of water, rinsed and dried. The resultant deep blue print possesses very good fastness to light and to washing.

*Example 10*

100 parts of cotton limbric are padded with a cold 2% aqueous solution of the dyestuff described below and 0.2% of a highly sulfonated oil, and the limbric is squeezed between rollers until its weight is 200 parts. The padded cloth is then transferred to a jig dyeing machine and treated with 500 parts of a cold liquor containing 15 parts of sodium chloride and 2½ parts of a soda ash for one hour. At the end of this time the cloth is rinsed thoroughly with water, scoured for 5 minutes in a boiling detergent solution, rinsed and dried. The fabric thus dyed is colored to a greenish-blue shade possessing excellent fastness to wet treatments.

A solution of 1.85 parts of cyanuric chloride in 16 parts of acetone is added gradually to a stirred mixture of 80 parts of water and 80 parts of crushed ice. To the stirred suspension of cyanuric chloride obtained, there is added, at 0° to 4° C., during 1 hour, a solution of 5.45 parts of the trisodium salt of 1-amino-4-(4'-amino-3'-carboxyanilino)anthraquinone-2:5-disulphonic acid in 200 parts of water. The reaction mixture is stirred for a further 1 hour at 0° to 4° C. and then sufficient 10% sodium carbonate solution is added gradually to render the mixture neutral to litmus. A solution of 5.7 parts of anhydrous disodium phosphate and 3.6 parts of anhydrous potassium dihydrogen phosphate in 50 parts of water is then added and after stirring for 15 minutes, sufficient sodium chloride to give a concentration of 50 gm. per litre is added. The reaction mixture is stirred until precipitation of the dyestuff is complete and is then filtered. The solid is washed on the filter with a solution of 10 parts of sodium chloride, 2.3 parts of anhydrous disodium hydrogen phosphate and 1.44 parts of anhydrous potassium dihydrogen phosphate in 200 parts of water and finally dried at atmospheric temperature. The product is readily soluble in water.

The manipulative procedure of Example 10 has been used with each of the dyestuffs numbered 1 thru 9, 11 thru 17, 22 thru 26, and 28 thru 30, inclusive, in the above table. Dyed fabrics were obtained in each case having the shade indicated in the table, each dyed material possessing excellent fastness of color characteristics to wet treatments.

*Example 11*

100 parts of spun viscose rayon pieces are padded with a 2% aqueous solution of the dyestuff described below and 0.2% of a highly sulphonated oil and squeezed between rollers until its weight is 200 parts. The cloth is then transferred to a winch dyeing machine and treated with 3000 parts of an aqueous liquor containing 90 parts of common salt and 15 parts of soda ash at 85° C. for one hour. At the end of this time the cloth is rinsed and scoured as described in Example 10.

The cloth is thus dyed to a blue shade possessing excellent fastness to washing.

A solution of 2.4 parts of 2:4-dichloro-6-methoxy-s-triazine in 12 parts of acetone is added gradually to a stirred mixture of 60 parts of water and 60 parts of crushed ice. The suspension so obtained is warmed to 30° C. and a solution of 7.2 parts of the disodium salt of 1-amino-4-(3'-β-hydroxyethylamino)anilinoanthraquinone-2:5-disulphonic acid in 200 parts of water is added gradually over 40 minutes, the temperature of the reaction mixture being maintained between 28° C. and 30° C. during the addition. The mixture is stirred at this temperature for a further 1½ hours and then sufficient 10% aqueous sodium carbonate solution is added gradually to make the reaction mixture neutral to litmus. A solution of 2 parts of anhydrous disodium hydrogen phosphate and 4 parts of anhydrous potassium dihydrogen phosphate in 20 parts of water is added to the mixture and then sufficient sodium chloride is added to give a concentration of 140 grams per litre. The mixture is cooled to 15° C. and stirred until precipitation of the dyestuff is complete. The suspension is then filtered and the dyestuff on the filter is washed with a solution of 30 parts of sodium chloride, 3 parts of anhydrous disodium hydrogen phosphate and 6 parts of anhydrous potassium dihydrogen phosphate in 200 parts of water and finally dried at room temperature.

In place of the above-described dyestuff, the manipulative procedure of this example has also been employed with each of the dyestuffs numbered 18–21, 27 and 31 in the above table. In each case, dyed fabrics were obtained having a shade indicated in the table, each dyed material possessing excellent fastness characteristics when subjected to wet treatments.

*Example 12*

100 parts of cotton limbric are padded with a cold 1% aqueous solution of the dyestuff described below, containing 0.2% of a highly sulphonated oil, and squeezed between rollers until its weight is 190 parts. The limbric is then dried at 40° C. and then padded with a cold 2% aqueous solution of anhydrous sodium carbonate containing 35% sodium chloride, squeezed between rollers until its weight is 200 parts, and steamed for 2 minutes at 100° C. It is then rinsed in hot water, immersed for 2 minutes in a boiling aqueous detergent solution, rinsed again and dried.

The cotton limbric is thus dyed to a reddish-blue shade possessing excellent fastness to washing.

A solution of 3.2 parts of 2:4-dichloro-6-phenoxy-s-triazine in 80 parts of acetone is stirred and diluted gradually with 50 parts of water. The solution obtained is warmed to 30° C. and a solution of 7.36 parts of the disodium salt of 1-amino-4-(4'-n-butylamino)-anilinoanthraquinone-2:3'-disulphonic acid in a mixture of 100 parts of water and 56 parts of acetone is added gradually over 1 hour, the temperature of the reaction mixture being maintained between 28° C. and 30° C. during the addition. The mixture is stirred at the same temperature for a further 1 hour and then sufficient 10% aqueous sodium carbonate solution is added gradually to make the mixture neutral to litmus. The mixture is cooled to 20° C. and a solution of 2 parts of anhydrous disodium hydrogen phosphate and 4 parts of anhydrous potassium dihydrogen phosphate in 20 parts of water is added followed by 15 parts of sodium chloride. The mixture is stirred for 15 minutes and then poured gradually into 630 parts of saturated sodium chloride solution with stirring. The suspension is stirred for 30 minutes, filtered and the dyestuff on the filter is washed with a solution of 40 parts of sodium chloride, 6 parts of anhydrous disodium hydrogen phosphate and 12 parts of anhydrous potassium dihydrogen phosphate in 400 parts of water and finally dried at room temperature.

Example 13

100 parts of cotton limbric are padded with a cold 4% aqueous solution of the dyestuff described below, containing 0.2% of a highly sulfonated oil, and the limbric is then squeezed until its total weight is 200 parts and then dried at 40° C. It is then padded with a 1% aqueous solution of sodium hydroxide containing 30% common salt and squeezed until its weight is 200 parts. It is then hung in the air for one minute, rinsed thoroughly with hot water and then immersed for two minutes in a boiling aqueous detergent solution, then again rinsed in hot water and dried.

The cotton limbric is thus dyed to a greenish-blue shade possessing excellent fastness to washing.

A solution of 2.9 parts of cyanuric chloride in 17.5 parts of acetone is added gradually to a stirred mixture of 80 parts of water and 80 parts of crushed ice. To the stirred suspension of cyanuric chloride thus obtained, there is added at 0° to 4° C. during 1¼ hours a solution in 200 parts of water of 10.16 parts of the sodium salt of 1-amino-4-[4'-(4"-aminophenyl)-anilino]anthraquinone-2:5:3"-trisulphonic acid which may be prepared by condensing 4-bromo-1-aminoanthraquinone-2:5-disulphonate with benzidine-3-sulphonic acid. The reaction mixture is stirred a further 1 hour at 0° C. to 4° C. and then sufficient 10% carbonate solution is added gradually to render the mixture neutral to litmus. A solution of 11.4 parts of anhydrous disodium hydrogen phosphate and 7.2 parts of anhydrous potassium dihydrogen phosphate in 100 parts of water is then added and after stirring for 15 minutes, sufficient sodium chloride to give a concentration of 30 gm. per litre is added. The mixture is stirred for a further 30 minutes and then filtered. The solid is washed on the filter with a solution of 25 parts of sodium chloride, 11.4 parts of anhydrous disodium hydrogen phosphate and 7.2 parts of anhydrous potassium dihydrogen phosphate in 500 parts of water and finally dried at atmospheric temperature. The product is a dark blue powder which is readily soluble in water.

Example 14

100 parts of cotton limbric are dyed by the method of Example 13, except that the limbric is steamed for one minute at 100° C. immediately after padding with the caustic soda and salt solution.

The cotton limbric is thus dyed to a greenish-blue shade possessing excellent fastness to washing.

Example 15

100 parts of cotton limbric are padded with a cold 2% aqueous solution of the dyestuff described below, containing 0.5% of sodium bicarbonate and 0.2% of a highly sulphonated oil, and squeezed between rollers until its weight is 200 parts. The limbric is then steamed for four minutes at 102° C. It is then rinsed with hot water, immersed for two minutes in a boiling detergent solution, rinsed and dried.

The cotton limbric is thus dyed to a reddish-blue possessing excellent fastness to washing.

A solution of 4 parts of 2:4-dichloro-6-methoxy-s-triazine in 20 parts of acetone is added gradually to a stirred mixture of 80 parts of water and 80 parts of crushed ice. The suspension so obtained is warmed to 30° C. and a solution containing 10.94 parts of the disodium salt of 1-amino-4-(4'-methylaminoanilino)-anthraquinone-2:3'-disulphonic acid in 250 parts of water, is added gradually over 1½ hours, the temperature of the reaction mixture being maintained at between 29° C. and 30° C. during the addition. The mixture is stirred for a further 1 hour at this temperature, and then cooled to 18° C. Sufficient 10% aqueous sodium carbonate solution is added gradually to make the reaction mixture neutral to litmus. Sufficient sodium chloride is then added to give a concentration of 240 grams per litre and the suspension so obtained is warmed to 33° C. and stirred for 15 minutes at this temperature. The suspension is cooled to 20° C. and filtered and the dyestuff on the filter is washed with 20% sodium chloride solution and finally dried at room temperature.

Example 16

100 parts of cotton limbric are padded with a cold aqueous solution containing 2% of the dyestuff described below, 0.2% of a highly sulfonated oil and 8% of sodium trichloroacetate, and squeezed between rollers until its weight is 200 parts. It is then steamed for 3 minutes at 102° C., rinsed in hot water, immersed for two minutes in a boiling detergent solution, rinsed again and dried.

The cotton limbric is thus dyed to an olive green shade possessing excellent fastness to washing.

A solution of 4.06 parts of cyanuric chloride in 20 parts of acetone is added gradually to a stirred mixture of 50 parts of water and 100 parts of crushed ice. To the stirred suspension of cyanuric chloride thus obtained there is added at 0° to 4° C. during 1 hour a solution in 250 parts of water of 14.8 parts of the trisodium salt of 1-amino-4-[4'-(4"-aminophenylazo)-anilino]anthraquinone-2:2":5-trisulphonic acid, which may be prepared by condensing 4-bromo-1-aminoanthraquinone-2:5-disulfonic acid with 4:4'-diaminobenzene-2-sulfonic acid in alkaline medium. The mixture is stirred for a further 40 minutes at 0°–4° C. and then sufficient 2 N. sodium carbonate solution is added gradually during 30 minutes to render the reaction mixture neutral to litmus. A solution of 11.4 parts of disodium hydrogen phosphate and 7.2 parts of potassium dihydrogen phosphate in 100 parts of water is added, the mixture is stirred for 10 minutes and then sufficient sodium chloride to give a concentration of 50 grams per litre is added and the mixture is stirred for 3 hours when separation of the dystuff is complete. The mixture is filtered, and the solid on the filter is washed with a solution of 25 parts of sodium chloride, 11.4 parts of disodium hydrogen phosphate and 7.2 parts of potassium dihydrogen phosphate in 500 parts of water, and finally dried at atmospheric temperature. The product dissolves readily in water.

Example 17

100 parts of cotton limbric are dyed by the method of Example 1, the caustic soda being replaced by 2.5% of triethanolamine carbonate.

The cotton fabric is dyed to a blue shade with excellent fastness to washing.

This substitution of triethanolamine carbonate for the caustic soda may also generally be used as a modification of the above-described processes.

Example 18

100 parts of cotton limbric are padded with a solution as used in Example 15 and then the limbric is squeezed between rollers until its weight is 200 parts. It is then heated in an oven at 110° C. for 4 minutes. The fabric is then rinsed and scoured as in Example 13.

The fabric is thus dyed to a reddish-blue shade possessing excellent wet fastness properties.

Example 19

A printing paste containing: Parts

| | |
|---|---|
| Dyestuff 17 of the table | 1.5 |
| Urea | 3 |
| Water | 59.5 |
| 5% aqueous sodium alginate solution | 35 |
| Sodium carbonate | 1 | is printed by roller on a cotton plain weave fabric. The fabric is dried, steamed for five minutes, rinsed in cold water, and scoured, rinsed and dried as described in Example 10.

The printed portion of the fabric is colored a reddish-blue shade having excellent fastness to washing and to light.

Example 20

A printing paste containing: Parts

| | |
|---|---|
| Dyestuff 29 on the table | 3 |
| Urea | 3 |
| Water | 56.8 |
| 5% aqueous sodium alginate solution | 35 |
| Sodium trichloroacetate | 2.2 | is printed by stencil on a spun viscose fabric. The fabric is then dried, steamed for 10 minutes, then rinsed, scoured, rinsed and dried as described in Example 10.

The printed portion of the fabric is colored a greenish-blue shade having excellent fastness to washing and to light.

Example 21

100 parts of viscose rayon yarn are added to a solution obtained by dissolving 2 parts of dyestuff No. 14 of the foregoing table in 3000 parts of water at a temperature between 18° C. and 20° C. 90 parts of sodium chloride are added and the yarn is agitated for 30 minutes. 6 parts of sodium carbonate are added, and after another 60 minutes the yarn is removed and rinsed and scoured as described in Example 1.

The yarn is dyed a bright blue shade possessing excellent fastness to washing and to light.

We claim:

1. The process for the coloring of cellulose textile materials which comprises impregnating said textile materials in aqueous medium with an anthraquinone dyestuff containing at least one ionogenic solubilizing group and an amino group selected from the group consisting of primary and secondary amino groups carrying as N-substituent a 1:3:5-triazine radical containing a halogen atom attached to a carbon atom of said triazine ring, and thereafter subjecting the impregnated textile materials to the action of an acid-binding agent in aqueous media.

2. The process of claim 1, wherein said acid-binding agent is caustic alkali.

3. The process of claim 1, wherein said acid-binding agent is an alkali metal salt of a weak inorganic acid.

4. The process of claim 1, wherein said aqueous medium also contains a migration inhibitor.

5. The process of claim 1, wherein said dyestuff is placed in said aqueous medium in the form of a stabilized buffered composition.

6. The process of claim 1, wherein said ionogenic solubilizing group in said dyestuff is selected from the group consisting of $-CO_2H$ and $-SO_3H$ groups.

7. The process of claim 1, wherein said dyestuff is obtained by condensing one molecular proportion of an amino-anthraquinone compound containing at least one ionogenic solubilizing group with one molecular proportion of cyanuric chloride.

8. The process of claim 1, wherein said cellulose textile material is selected from the group consisting of cotton, linen, and regenerated cellulose.

9. The process of claim 1, wherein said cellulose textile materials are impregnated with a substance which liberates said acid-binding agent in situ by the action of elevated temperature, and wherein said impregnated cellulose textile materials are subjected to said action of said elevated temperature.

10. The process of claim 9, wherein said acid-binding agent is liberated from said substance in situ by steaming at said elevated temperature.

11. The process of claim 10, wherein said substance is an alkali metal bicarbonate.

12. The process of claim 1, wherein said aqueous medium containing said acid-binding agent also contains as an added electrolyte an inorganic salt of an alkali metal.

13. The process of claim 12, wherein said added electrolyte is selected from the group consisting of sodium chloride and sodium sulfate.

14. A process for printing cellulose textile materials which comprises applying to said materials a printing paste containing an anthraquinone dyestuff as defined in claim 1, and a substance selected from the group consisting of acid-binding agents and substances which on being subjected to the action of an elevated temperature liberate an acid-binding agent, drying the thus treated textile materials and thereafter subjecting the dried materials to the action of elevated temperatures.

15. The process of claim 14, wherein said treated textile materials are subjected to the action of an elevated temperature by steaming.

16. The process of claim 14, wherein said substance is an alkali metal bicarbonate.

17. The process of claim 14, wherein said printing paste also contains sodium alginate.

18. The process of claim 14, wherein the ionogenic solubilizing group present in said dyestuff is selected from the group consisting of $-CO_2H$ and $-SO_3H$ groups.

19. The process of claim 14, wherein said dyestuff is obtained by condensing one molecular proportion of an amino-anthraquinone compound containing at least one ionogenic solubilizing group with one molecular proportion of cyanuric chloride.

20. The process of claim 14, wherein said cellulose textile material is selected from the group consisting of cotton, linen, and regenerated cellulose.

21. A printing paste for use in the process, claimed in claim 14, which contains a dyestuff as defined in claim 1 and a substance which liberates an acid-binding agent when exposed to the action of elevated temperatures.

22. The printing paste of claim 21, wherein said substance is an alkali metal bicarbonate.

23. The process for the dyeing of cellulose textile materials which comprises impregnating said textile materials which an aqueous solution of an anthraquinone dyestuff containing at least one ionogenic solubilizing group and an amino group selected from the group consisting of primary and secondary amino groups carrying as N-substituent a 1:3:5-triazine radical containing a halogen atom attached to a carbon atom of said triazine ring, said aqueous solution also containing a migration inhibitor, thereafter drying the thus impregnated cellulose textile materials, and then subjecting the dried materials to the action of an acid-binding agent.

24. The process of claim 23, wherein said acid-binding agent is an aqueous solution containing at most 20% by weight of caustic alkali.

25. The process for the dyeing of cellulose textile materials which comprises impregnating said textile materials with an aqueous solution of an anthraquinone dyestuff containing at least one ionogenic solubilizing group and an amino group selected from the group consisting of primary and secondary amino groups carrying as N-substituent a 1:3:5-triazine radical containing a halogen atom attached to a carbon atom of said triazine ring, said solution also containing a substance which liberates an acid-binding agent by the action of elevated temperature, and thereafter subjecting the thus impregnated cellulose textile materials to said action of said elevated temperature.

26. The process of claim 25, wherein said solution also contains a migration inhibitor.

27. The process of claim 26, wherein said solution also contains urea.

References Cited in the file of this patent

UNITED STATES PATENTS

| | | |
|---|---|---|
| 1,886,480 | Haller | Nov. 8, 1932 |
| 2,722,527 | Wehrli | Nov. 1, 1955 |

FOREIGN PATENTS

| | | |
|---|---|---|
| 543,301 | Great Britain | Feb. 18, 1942 |